C. KUENTZEL.
MACHINE FOR INSERTING WIRES IN THE RIM ENGAGING PORTION OF SOLID TIRES.
APPLICATION FILED OCT. 22, 1913.

1,110,800.

Patented Sept. 15, 1914.
2 SHEETS—SHEET 1.

Witnesses

Inventor
Curt Kuentzel

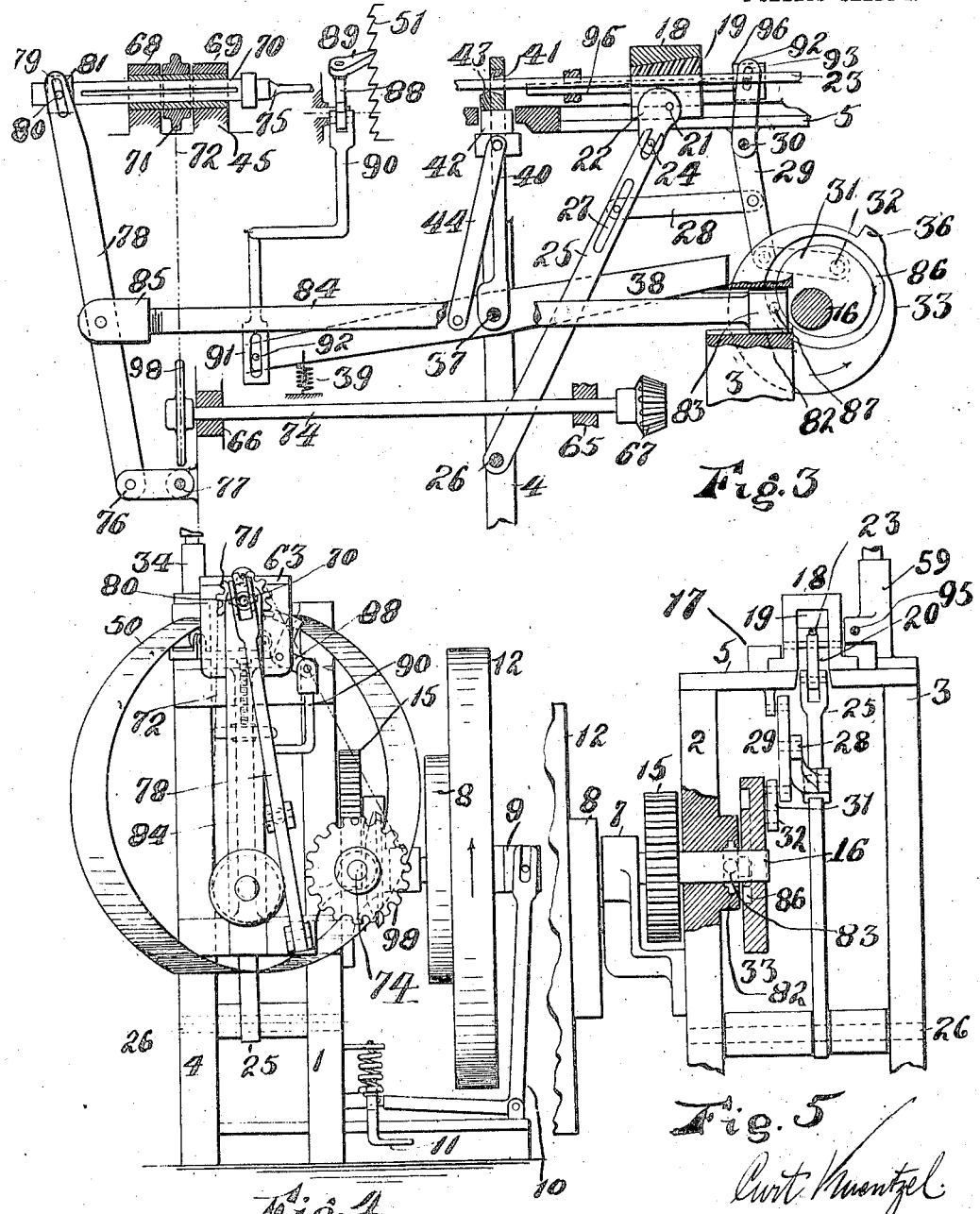

UNITED STATES PATENT OFFICE.

CURT KUENTZEL, OF AKRON, OHIO, ASSIGNOR TO THE GOODYEAR TIRE AND RUBBER COMPANY, OF AKRON, OHIO, A CORPORATION OF OHIO.

MACHINE FOR INSERTING WIRES IN THE RIM-ENGAGING PORTION OF SOLID TIRES.

1,110,800.    Specification of Letters Patent.    Patented Sept. 15, 1914.

Application filed October 22, 1913. Serial No. 796,591.

*To all whom it may concern:*

Be it known that I, CURT KUENTZEL, a subject of William II, Emperor of Germany, residing at Akron, in the county of Summit and State of Ohio, have invented new and useful Improvements in Machines for Inserting Wires in the Rim-Engaging Portion of Solid Tires, of which the following is a specification.

This invention relates to machines for inserting cross-wires in the base portion of solid tires and the primary objects of this invention are to provide a machine capable of inserting cross-wires in a vulcanized tire of annular formation, if desired, and designated to place them at approximately any angle with respect to the longitudinal line of the tire. The mechanism for accomplishing these results embodies a rotary reciprocating drill for drilling the openings in the vulcanized tire, an inserting device for inserting the end of a continuous wire in the opening formed by the drill; shearing mechanism for shearing off the extending portion of the wire; a hammer for further forcing the severed wire section into the tire; means for suitably supporting an annular vulcanized tire in approximately any position to cause the placement of the wires at any preferred angle.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

Figure 1:
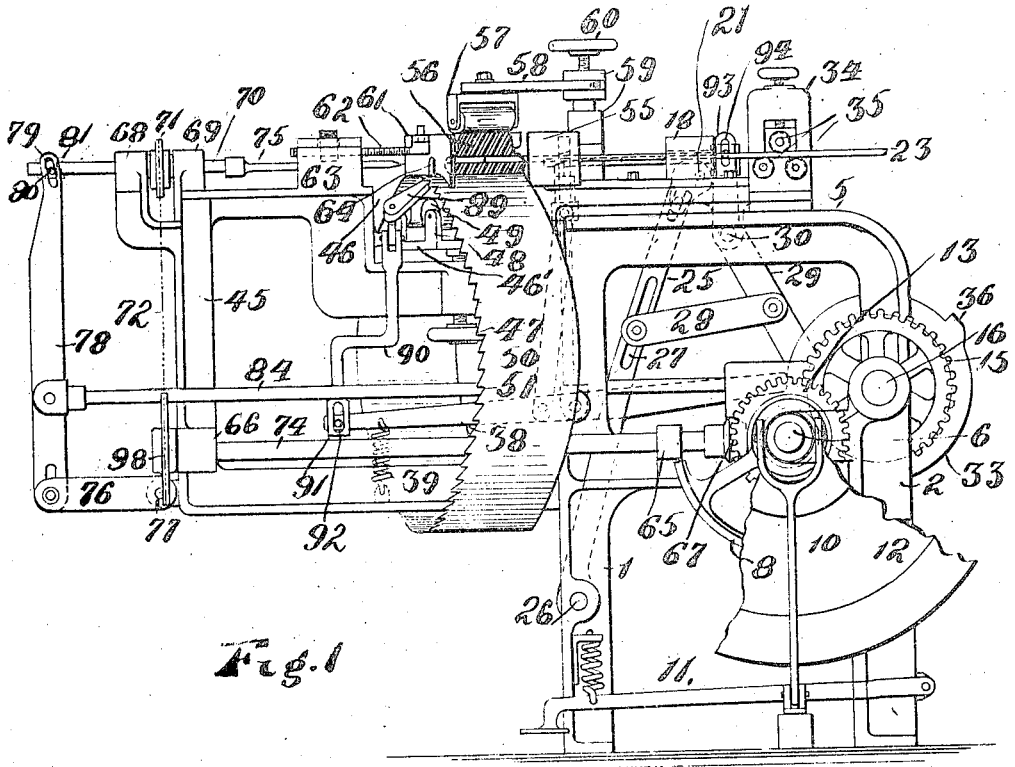
Figure 2:
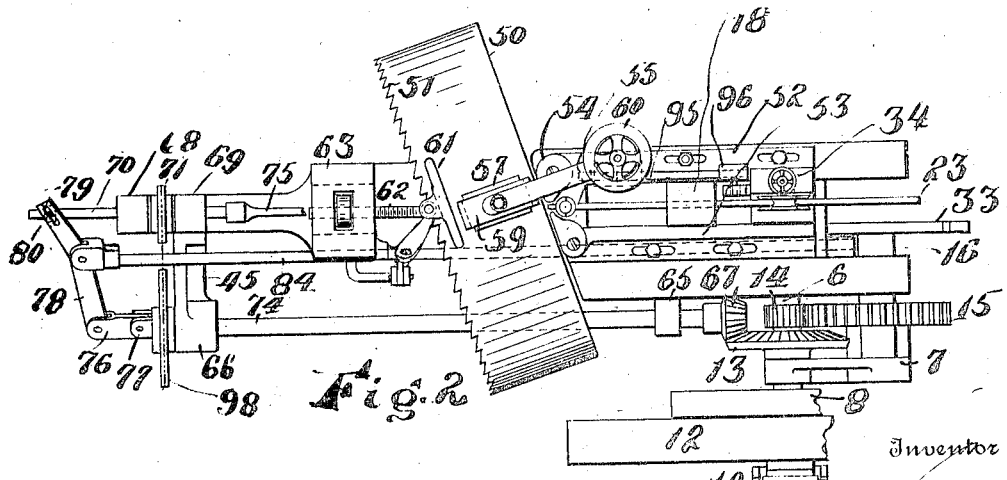

In the drawings in which similar reference numerals indicate like parts in the different figures, Figure 1, is a view in side elevation of a device embodying this invention; Fig. 2, is a plan; Fig. 3, is a diagrammatic view of portions of the mechanism; Fig. 4, is an elevation looking from the left in Fig. 1; and, Fig. 5, is a detail of a portion of the mechanism with parts thereof broken away to better illustrate the construction.

In detail, the invention embodies a frame comprising legs 1, 2, 3 and 4 arranged in pairs, and the respective pairs connected at their upper portions by a member 5 forming a platform or supporting instrumentality. Mounted in suitable bearings in the framework is a rotatable shaft 6 supported by a bracket 7 outside of the pair of legs 1 and 2. Mounted on the shaft 6 is a belt-receiving pulley 8 by which motion is communicated to the shaft. The belt pulley 8 is preferably connected with one member of a clutch 9 operated by a bell-crank lever 10 connected with a foot treadle 11 so that the rotation of the shaft 6 may be controlled at will. Also mounted on the shaft 6 is a heavy balance fly-wheel 12. The shaft also bears a bevel gear 13 for a purpose to be later described. On the shaft 6 is a spur-pinion 14 adapted to mesh with a bevel-gear 15 on a counter shaft 16 also mounted in suitable bearings in the frame.

The mechanism for feeding a wire continuously and progressively forward, step by step, is as follows: Mounted in suitable slides 17 on the upper member 5 of the frame is a gripping member 18 provided with an opening having a hardened steel plate or bushing 19 therein against which the wire is clamped when it is desired to feed the wire to the left in Fig. 1. The lower portion of the gripping member 18 is open to provide a space 20 (see Fig. 5) and extending across this face is a pin 21 on which is mounted a cam 22 so fashioned that when swung in one position, (the left in Fig. 1) it will engage the wire 23 and force it against the hardened bushing 19, thereby effectually gripping it. The lower end of the cam is provided with a pin 24 to receive the bifurcated upper end of an oscillating lever 25 the lower end of which is fulcrumed on a pin 26 extending between the legs 1 and 4. The lever 25 is provided intermediate its ends with a longitudinal slot 27 to receive a pin on the end of a link 28 the opposite end of which is pivotally connected with a lever 29 pivoted on a pin 30 in a suitable bracket on the under face of the member 5. The lower end of the lever 29 is pivotally connected with a link 31 which is in turn pivotally attached to a pin 32 on one face of a cam 33 fixedly mounted on the shaft 16. It will be obvious that as the cam 33 is rotated an oscillatory movement is communicated through the hereinbefore described mechanism to the lever 25 and as its first movement is to the left in Fig. 3 it will rock the cam 22 on its axis. The cam engages the wire 23 and grips the same and after this gripping operation has taken place the gripping member 18 will be shifted to the left, carrying with it the projecting end of the wire 23. Adjacent to the gripping member 18 is a wire straightener 34 embodying three rollers 35 triangularly positioned between which the wire passes for removing kinks and bends, but as this is of ordinary construction a further description is believed to be unnecessary. The cam member 33 bears a projecting lug 36 for a purpose to be later described.

Extending between the legs 1 and 4 is a pin 37 on which is mounted a vertically-oscillating lever 38 the right end of which is arranged to lie in the path of the lug 36 and be depressed thereby during the revolution of the latter. The opposite end of the lever is normally depressed by a coiled resilient element 39. Secured to the pin 37 between the legs 1 and 4 is an upright member 40 the lower portion of which constitutes a guide for mechanism to be described later, and the upper end is provided with a conical opening 41 preferably provided with a hardened bushing and constituting one member of a shearing element for cutting off a section of the wire as the wire is passed through the opening 41 due to the movement of the gripping member 18. Slidably mounted on the member 40 is a vertically reciprocating member 42 the upper end of which is provided with a knife 43 adapted to co-act with the bushing. The member 42 is caused to reciprocate vertically on the member 40 through the medium of a connecting rod 44 which is pivoted eccentrically on the lever 38.

From the foregoing description it will be seen that as the cam 33 revolves and the lug 36 encounters the free end of the lever 38 it causes the latter to swing downwardly thereby raising the opposite end of the lever and forcing the member 42, carrying the movable shear-member 43 upwardly, thereby severing the wire.

Extending to the left in Fig. 1 and secured to the leg 1 and 4 is a frame 45 provided with a cut-out portion to provide a recess 46 in which is mounted a vertically adjustable shaft 47 on which is a turn-table 46'. This turn table bears pairs of alined arms 48. Between the members of each pair is a roller 49 constituting a supporting medium for a drum 50 having one edge 51 provided with ratchet-teeth for a purpose to be later described. The horizontal position of the turn-table 46 is adjustable so that the drum may revolve at any angle with respect to the longitudinal line of the wire and in order to guide the drum I provide a pair of slides 52 and 53 adjustably secured to the upper face of the platform 5 and provided with heads 54 and 55 respectively, capable of being adjusted at approximately any desired angle with respect to the drum and the tire mounted thereon.

In practice, a tire 56 usually of annular formation, is placed on the drum and held thereon in engagement with the upper portion of the periphery of the drum by a roller 57 held in place by an arm 58 extending from a post 59 on the member 5 and capable of being raised and lowered by a hand-wheel 60. In order to hold the tire against lateral thrust on one side the members 54 and 55 are provided. The opposite side of the tire is held in position by means of a shiftable abutment consisting of a plate 61 secured in position by means of a rod 62 secured to a standard 63 on the frame 45. This abutment is provided with a slotted opening 64 for a purpose to be later described.

The mechanism for drilling an opening in the tire preparatory to the insertion of the wire is accomplished by the following mechanism: Secured in a bearing 65 on the frame and in a bearing 36 on the frame 45 is a revoluble shaft 74 provided at one end with a beveled-pinion 67 intermeshing with the bevel-gear 13 and receiving motion therefrom. Mounted in suitable bearings 68 and 69 on the frame 45 is a shaft 70. This shaft 70 bears a sprocket-wheel 71 from which a sprocket-chain extends to and around a sprocket-wheel 98 on the shaft 74 whereby the shaft 70 is revolved. The right end of the shaft 70 is provided with a socket in which is secured a needle or drill 75. The needle passes through a suitable guiding opening in the standard 63 when reciprocated by mechanism to be described and passes through the slot 64 and tire 56. The mechanism for reciprocating the shaft 70 and needle 75 comprises a link 76 pivotally mounted at 77 on the frame 45 and connected at its outer end with an oscillating lever 78 the upper end of which is provided with slots 79 to receive transverse pins 80 on a loose collar 81 on the shaft 70, as shown in Fig. 3 so as to permit both longitudinal reciprocation and rotation of the needle 75. In order to rock the lever 78 there is provided between the legs 2 and 3 a box or ways 82 in which is adapted to move reciprocally the head 83 of a rod 84 the opposite end 85 of which is pivotally connected with a lever 78. In order to reciprocate the rod 84 there is provided in one face of the cam 33 a race 86 in which runs a pin 87 on one face of the head 83 of the rod 84 and as the cam 33 revolves, the shaft 70 and needle 75 will be alternately reciprocated, driving a needle through the base or rim-engaging portion of the tire 56.

In order to accurately space the position of the wires in the tire, the drum 50 is caused to move intermittingly by the following mechanism: Mounted on a bell-crank lever 88 on the frame 45 is a pawl 89 which engages the ratchet-teeth in the edge of the drum 50. The opposite end of the bell-crank lever 88 is connected to a bent connecting rod 90 the opposite end of which is extended downwardly and is provided with a bifurcated lower end 91 which straddles the end of the lever 38. The bifurcated end 91 is provided with vertical slots in which are extended transverse pins 92.

As the gripping member 18 which feeds forward the wire 23 does not completely embed the wire in the opening made by the drill in the base or rim-engaging portion of the tire and as it is necessary to have the shearing members placed at a slight distance from the face of the tire in order to perform its functions, a short piece or end of wire projects from the side of the tire after the shearing operation and in order to drive these projecting ends of the wire into the tire so as to bring these ends flush with the side faces of the tire, I provide the following mechanism: The lever 29, pivoted on the pin 30 has an extension 93 projecting upwardly through the platform 5. This extension 93 is provided at its upper end with a slot 94. Slidably mounted in a suitable opening in the post 59 is a hammer 95 provided with a head 96 having a laterally projecting pin which engages the slot 94. The hammer 95 is adapted to move approximately simultaneously with the gripping member 18 but in an opposite direction thereto and the post 59 provides a suitable guiding and supporting member for the hammer. In practice, the hammer will be withdrawn out of the path of the projecting end of the wire which has just been inserted in the tire and which has been severed from the continuous wire 23 and the projecting wire is brought by the pawl into direct alinement with the hammer which at its next reciprocation forces it into the tire and with the ends thereof flush with the side faces of the tire.

It is thought that the operation of the device will be apparent from the description of the mechanism, but for accuracy it is thought that a short description will be of assistance.

An annular tire is positioned loosely on the drum 50 and the angle at which it is desired to place the wires in the tire is determined and the drum adjusted by shifting the turn-table 46' and the members 52 and 53. The abutment plate 61 is then placed so as to engage the side of the tire and lock it in position. In practice, a tire will be usually considerably larger than the drum, but the upper portion which engages the drum will be forced downwardly into position by means of the roller 57. As the mechanism operates the needle or drill is reciprocated back and forth while being continuously rotated and after passing through the tire and as it starts on its return, the gripping member 18 will advance, forcing the end of the wire 23 into the opening made in the tire, and as the gripping member reaches the end of its stroke, the shearing member 43 is raised sufficiently to shear off the inserted piece, leaving a portion thereof projecting. As soon as the shearing operation has taken place the continuous upward movement of the free end of the lever 38 which is controlled in its operation by the lug 36, is raised sufficiently to bring the pins 92 into engagement with the upper end of the slot 91, thereby raising the bent connecting-rod 90 upwardly to rock the bell-crank 88 causing the pawl 89 to force the drum forward a fractional portion of a revolution. As has heretofore been described, the hammer is withdrawn to permit the extended end of the wire to be properly positioned, it is then forced into the tire thereby. As soon as the position of the drum has been shifted, the drill 75 will again perform its function on the portion of the tire in front of the slot 64 in the abutment plate 61 and at the next forward reciprocation of the gripping-member 18 a wire is forced into the opening made by the needle, the hammer 96 will force the projecting end of the preceding wire firmly to its place and flush with the side faces of the tire.

I claim:—

1. A machine for embedding cross wires in the rim-engaging portions of a tire comprising an annularly-shaped drum constituting a supporting means for a tire, a guide provided with an opening and arranged to engage the lateral face of the tire while on said drum, a roller engaging the tread portion of the tire while mounted on said drum, a drill adapted to pass through said opening in said guide and to form openings transversely in the supported tire, and means for inserting a fastener in said opening after the withdrawal of said drill.

2. A machine for embedding cross wires in the rim-engaging portions of a tire comprising an annularly-shaped drum constituting supporting means for a tire, a drill adapted to form an opening transversely in the tire, pivotal means to support said drum to permit its revolution by a step-by-step movement, and further to permit the drum to be positioned at different angles with respect to the axial line of the drill, and means for inserting a fastener in said opening after the withdrawal of said drill.

3. A machine for embedding cross wires in the rim-engaging portions of a tire comprising an annularly-shaped drum constituting a supporting means for the tire, a guide engaging the lateral face of the tire and provided with an opening, a pressure roll engaging the tread of the tire for holding it on the drum, a drill adapted to pass through the opening in said guide and to form openings transversely in the supported tire, a pivotal support for said drum to permit it to be positioned at different angles with respect to the axial line of the drill while permitting its revolution, mechanism for imparting to said drum a step-by-step revolution, and means for inserting a fastener in said opening after the withdrawal of said drill.

In testimony whereof I have hereunto set my hand in presence of two subscribing witnesses.

CURT KUENTZEL.

Witnesses:
  H. B. HAMLEN,
  R. M. LE MIEUX.